UNITED STATES PATENT OFFICE.

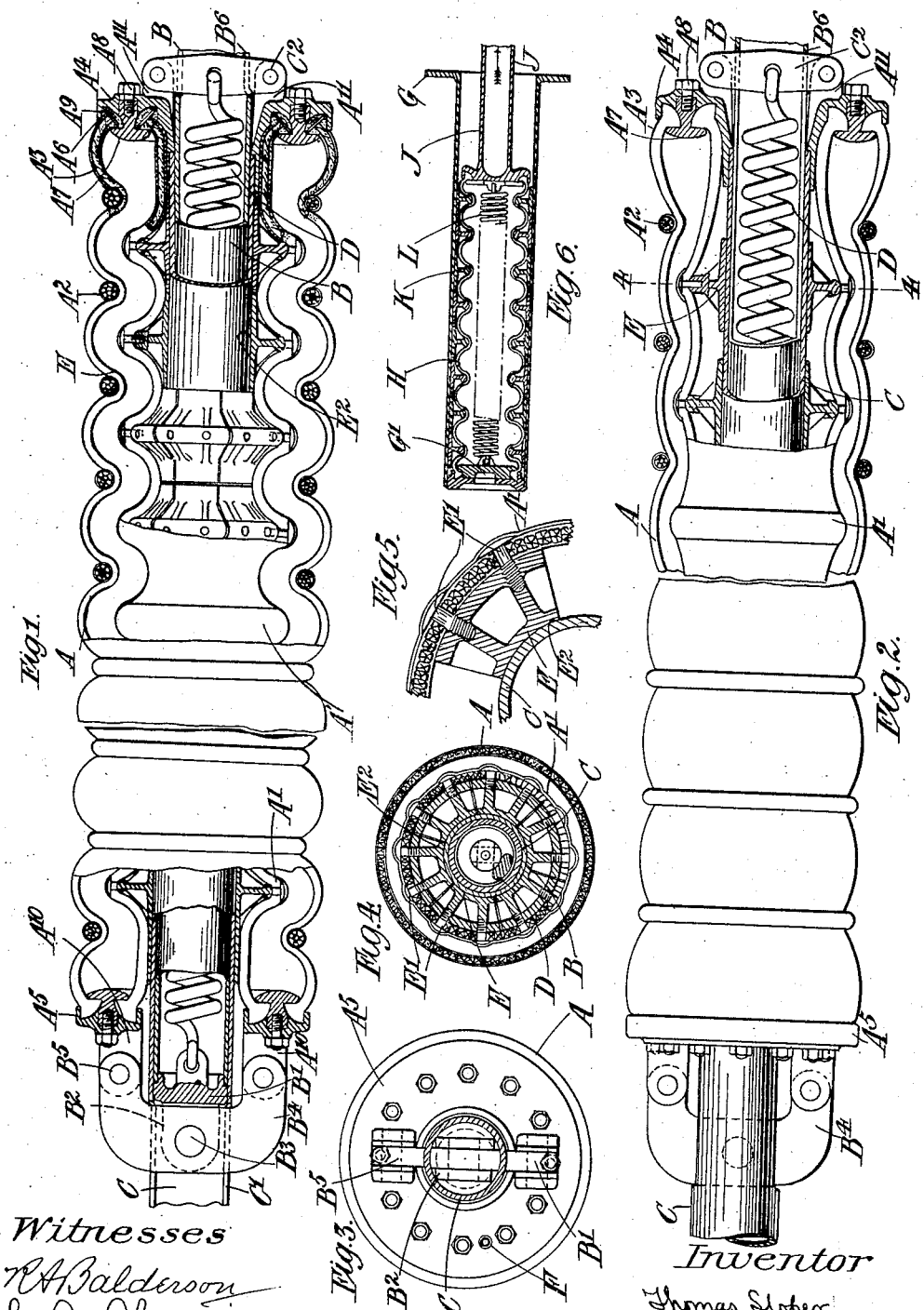

THOMAS SLOPER, OF DEVIZES, ENGLAND.

SHOCK-ABSORBER.

1,304,818.  Specification of Letters Patent.  Patented May 27, 1919.

Application filed January 9, 1918. Serial No. 210,988.

*To all whom it may concern:*

Be it known that I, THOMAS SLOPER, a subject of the King of England, residing at Devizes, Wiltshire, England, have invented certain new and useful Improvements in Shock-Absorbers, of which the following is a specification.

This invention is for improvements in or relating to shock-absorbers and has particular reference to shock-absorbers for aeroplanes. As is well-known one means employed in aeroplanes for absorbing the shock of landing consists of elastic cord connecting the axle with the under-carriage which elastic "gives" when the wheels strike the ground.

Shock-absorbers for motor cars have been proposed in which a plurality of springs are so arranged that as the load increases, additional springs come into action, and also pneumatic chambers have been suggested which are compressed by the load, such chambers being either sealed or provided with a small aperture to operate as a dashpot.

It will be appreciated that in all shock-absorbers, the element or elements which absorb shock must operate between two members which apply the force to be absorbed, one of which members is operatively connected also with the part from which the shock is transmitted, such as the axle of the landing-wheels of an aeroplane, and the other with the part to which it is desired to prevent the shock from being transmitted, such as the general framing of an aeroplane. These two members are hereinafter referred to throughout the specification and claims as "thrust" members, as being the members which apply the force to the shock-absorbing element or elements whether that force be acting upon the said members in compression or tension.

According to this invention, the shock-absorber comprises the combination with two "thrust" members whose operative ends are moved apart during the absorption of shock, of a pneumatic chamber whose shape is such that opposite ends of it are held in by inflation and are connected to the operative ends of the said two "thrust" members, one to each, so that the pneumatic chamber is forcibly extended against the action of the pneumatic pressure when the said ends of the "thrust" members are moved apart during the absorption of shock.

If desired, braking means may be employed to retard the movement of extension of the pneumatic chamber, which braking means is controlled by the pneumatic pressure within the chamber, for the purpose of increasing the braking effect as the pressure increases.

For braking, the member to which the braking action is applied may extend into the pneumatic chamber and the braking means may take the form of an inner wall of the chamber which surrounds the said chamber, is transversely corrugated and is provided with a braking surface whereby such surface is forced against the sides of the braking member by the pneumatic pressure in the chamber, and has sliding movement relatively thereto as the chamber is extended.

Instead of the braking-member extending within the chamber, it may surround the pneumatic chamber and the braking means may take the form of a braking surface on the opposed wall of the said chamber, which wall is transversely corrugated, whereby the said braking surface is forced against the braking member by the pneumatic pressure in the chamber and has sliding movement relatively thereto as the chamber is extended.

In the accompanying drawings which illustrate one method of carrying out this invention:—

Figure 1 shows a shock-absorber in elevation with the members at both ends in central vertical section;

Fig. 2 shows in elevation the shock-absorber illustrated in Fig. 1 extended as when absorbing shock and having the members at one end only in central vertical section;

Fig. 3 is an end view of the shock-absorber as viewed from the left of Figs. 1 and 2;

Fig. 4 is a section on the line 4—4 of Fig. 2;

Fig. 5 is a detail view of some of the parts of Fig. 4 on a larger scale than the scale of that figure, and Fig. 6 is a central vertical section through another form of shock-absorber according to the present invention.

The same letters indicate the same parts throughout the drawings.

The main shock-absorbing element in the device illustrated is the annular pneumatic chamber having outer and inner walls A, $A^1$ respectively, which are corrugated transversely of the length of the chamber as shown, the outer wall being tied in between the corrugations by cords $A^2$. The walls are built up of rubbered cord fabric the cords of which are indicated at $A^3$, and the chamber is made up in two separate sleeves, one of which constitutes the outer wall A and the other the inner wall $A^1$, which sleeves are secured together by annular end-plates $A^4$, $A^5$ respectively. To hold the walls in place and obtain an airtight joint, each wall is provided with a bead $A^6$ and the annular plates $A^4$, $A^5$ are shaped to receive one-half of each bead; the other half being engaged by a locking-ring $A^7$ which is approximately T-shaped in cross-section and is held in place by bolts $A^8$. The beads $A^6$ are built up of rubber or rubbered canvas and the ends of the cords $A^3$ are anchored therein by pins or the like indicated at $A^9$. This method of forming beads and anchoring cords therein is well-known in the construction of pneumatic tires and does not in itself constitute any part of the present invention.

The cords $A^3$ are placed parallel to each other and extend lengthwise of the tubes, being held together by rubber and vulcanized after the manner of the well-known Palmer tire fabric, or they need not run strictly parallel to the direction of the length of the tubes and some may be placed obliquely and others caused to cross them obliquely, but whatever arrangement is selected it should be such that the fabric can stretch in the lateral direction of the tubes A, $A^1$, but not stretch or stretch very much less in the longitudinal direction of the tubes. The holding-in cords $A^2$ may be of the same rubbered material used for the construction of the walls of the pneumatic chamber.

The thrust-members whereby the force to be absorbed is applied to the pneumatic chamber A, $A^1$, are concentrically mounted tubes B and C respectively, one of which is operatively connected to the part from which the shock to be absorbed is transmitted, such as the axle of the landing wheels of an aeroplane, and the other of which is operatively connected to the part to which the shock is to be prevented from being transmitted, such as the framing of an aeroplane. The tube B is the inner tube and has at its end a cap $B^1$ provided with a lug $B^2$ to which is pivoted at $B^3$ a cross-bar $B^4$. The ends of the cross-bar are pivoted at $B^5$ to lugs $A^{10}$ on the annular end-plate $A^5$ of the pneumatic chamber A, $A^1$. The tube C within which the tube B is free to move, is slotted at $C^1$ to permit the ends of the cross-bar $B^4$ to project therefrom and slide relatively to the tube C. This tube C extends into and through the whole length of the pneumatic chamber A, $A^1$ entering at the left-hand end thereof as viewed in Fig. 1 and being connected rigidly at its other end to the annular end-plate $A^4$ of the chamber. The end-plate $A^4$ carries lugs $A^{11}$ on opposite sides of it to which are pivoted the ends of a cross-bar $C^2$. A spiral spring D lies within the tube B, has one end connected to the cross-bar $C^2$, and the other end to the cap $B^1$ at the opposite end of the tube B. The tube B is slotted at $B^6$ to accommodate the cross-bar $C^2$ so that sliding movement can take place between these two parts.

As has been stated above, the corrugations in the outer wall A are maintained by the tying-in cords $A^2$, but the corrugations of the inner wall $A^1$ are maintained by metal rings E which are divided transversely into six segments, as shown in Fig. 4. The segments of the rings are secured to the inner wall $A^1$ of the pneumatic chamber by screws $E^1$ and their inner faces $E^2$ bear against the outer face of the "thrust" member C.

A valve F, Fig. 3, is provided for admitting air under pressure to the interior of the pneumatic chamber, and it will be seen that when the chamber is pumped up the pneumatic pressure will expand the wall A outward as far as possible and will thus draw the end-plates $A^4$ $A^5$ inward. The same pressure will force the inner corrugated wall $A^1$ against the segmental rings E so that the inner faces of the segments bear against the outer wall of the thrust-member C, which faces, as will hereinafter be seen, provide a braking surface for the said inner wall, and the member C acts as a braking-member for coöperation therewith. The spring D also tends to hold the ends of the pneumatic chamber in toward each other.

The operation of this device is as follows:—

Any number of shock-absorbers may be employed to operate between any two desired parts, and the spring D may be sufficiently strong so that when a proper number of shock-absorbers is employed, it will prevent the chamber A, $A^1$ from being extended by the ordinary working pressure brought to bear upon it, such as the weight of the aeroplane upon the landing-wheels when the aeroplane is stationary. If thrust is now applied to the outwardly-projecting ends of the tubes B and C tending to force them together as when an aeroplane is landing and the wheels strike the ground, the inner or operative ends of the tubes, that is the end of the tube B which carries the cross-bar $B^3$ and the end of the tube C which is connected to the annular plate $A^4$ of the pneumatic chamber, will be forced away from each other, with the result that the spring D will be extended and the ends of the pneumatic-chamber A, $A^1$ will be moved in such direction as to extend the chamber. This extension of the chamber causes the corrugations in the walls of the chamber to be flattened out as shown in Fig. 2 so that the area within the annular chamber is less than it is when the chamber is contracted as shown in Fig. 1. This reduction of area is resisted by the air within the chamber which is already under pressure and thus the shock is absorbed by the pneumatic chamber; the spring D, of course, also resists the extending movement and thus helps to absorb shock.

A further element in the absorption of shock by this device is the braking action which is produced between the segments of the rings E which bear against the tube C. It will be appreciated that the extension of the chamber A, A¹ by the flattening out of the corrugations of its walls produces relative movement between the chamber and the tube C although one end of the tube C is secured to the end A⁴ of the chamber. The braking-members E are always forcibly held against the tube C by the pneumatic pressure acting on the wall A¹ and this pressure is increased when the chamber is extended, so that as the extension of the chamber increases, the braking pressure increases, with the result that the braking effect is always greatest when the shock applied to the device is greatest.

When the tubes B and C are relieved of the thrust produced by shock, the pneumatic pressure in the chamber tends to again draw in the ends of the chamber and the spring D assists this action.

Instead of the braking-member being within the pneumatic chamber, that is, surrounded by the wall A¹ thereof, it may be situated outside the chamber, in which case the arrangement of the parts could be such as is diagrammatically shown in Fig. 6. In that figure the tube G constitutes one thrust-member and is connected by a plate G¹ to one end of a pneumatic chamber H. This is not an annular chamber but is corrugated transversely to the direction of its length and extensibility. The other end of the chamber is secured to an inner tube J which constitutes the other "thrust" member. The corrugations of the chamber H are held in by segmental rings K similar to the rings E but which are arranged outside of the chamber H instead of the tying-in cords A². The outer faces of these rings thus constitute a braking surface for the outer wall of the pneumatic chamber and bear against the inner wall of the tubular "thrust" member G. The two ends of the chamber are further connected by a spiral spring L which tends to draw the ends inward as does also the pneumatic pressure within the chamber. It will be seen that when the member J is thrust in the direction of the arrow relatively to the member G, the pneumatic chamber H will be extended against its pneumatic action, the spring L will be extended, and the movement will be resisted by the action of the braking-segments K operating against the inner wall of the thrust-member G.

The internal space of the pneumatic chamber may be partially filled with liquid to increase the pressure when the chamber is extended.

In the form shown, the brake-rings E butt one against another and thus provide a strut which limits the degree of endwise contraction of the chamber. The spring D may be a compression-spring instead of a tension-spring in some cases.

What I claim as my invention and desire to secure by Letters Patent is:—

1. In a shock-absorber the combination with two "thrust" members whose operative ends are moved apart during the absorption of shock, of a flexible pneumatic chamber whose shape is such that opposite ends of it are held in by inflation and are connected to the operative ends of the said two "thrust" members, one to each, so that the pneumatic chamber is forcibly extended against the action of the pneumatic pressure when the said ends of the "thrust" members are moved apart during the absorption of shock.

2. In a shock absorber, the combination with two thrust members whose operative ends are moved apart during the absorption of shock, of a flexible pneumatic chamber whose shape is such that opposite ends of it are held in by inflation and are connected to the operative ends of the said two thrust members, one to each, so that the pneumatic chamber is forcibly extended against the action of the pneumatic pressure when the said ends of the thrust members are moved apart during the absorption of shock, and braking means to retard the movement of extension of the pneumatic chamber, which braking means is controlled by the pneumatic pressure within the chamber, for the purpose described.

3. In a shock absorber, the combination of two thrust members whose opposite ends are moved apart during the absorption of shock, a pneumatic chamber extensible in one direction by being formed of flexible material corrugated transversely to the direction in which it extends, and a braking member which lies along the chamber in contact with a braking surface provided on the exterior of the chamber wall so that as the chamber extends the wall rubs along the said member and is pressed against the same by the pneumatic pressure obtaining in the chamber.

4. In a shock absorber, the combination of two thrust members whose operative ends are moved apart during the absorption of shock, a pneumatic chamber having a sleeve-like wall of flexible material corrugated transversely to the direction of its length to make it extensible, a second inner wall of flexible material which is also of sleeve-like form and corrugated transversely to the direction of its length to make it extensible, the inner and outer walls being connected together at their ends so that the pneumatic chamber is of annular form in cross-section, the said ends being connected to the aforesaid thrust members one to each, and a braking member secured to one end of the pneumatic chamber and extending into the central space provided by the inner wall where it has contact with the sides of the wall, the contacting parts being made in the form of braking surfaces and the pneumatic pressure within the chamber operating to keep the sides of the wall pressed against the braking member.

5. In a shock absorber, the combination of a pneumatic chamber having a sleeve-like wall of flexible material corrugated transversely to the direction of its length to make it extensible, a second inner wall of flexible material which is also of sleeve-like form and corrugated transversely to the direction of its length to make it extensible, the inner and outer walls being connected together at their ends so that the puenmatic chamber is of annular form in cross section, and two thrust members whose operative ends are moved apart during the absorption of shock, one of which members has one end of the pneumatic chamber secured relatively to it and the other member extending from the same end right through the central space provided by the inner wall and being secured to the opposite end of the chamber, the face of the chamber surrounding this member being provided with a braking surface for coöperation with an opposed braking surface on the thrust member.

6. In a shock absorber, the combination of a pneumatic chamber having a sleeve-like wall of flexible material corrugated transversely to the direction of its length to make it extensible, a second inner wall of flexible material which is also of sleeve-like form and corrugated transversely to the direction of its length to make it extensible, the inner and outer walls being connected together at their ends so that the pneumatic chamber is of annular form in cross-section, and two telescopically arranged tubes mounted in the throughway provided at the center of the chamber by the inner wall, which tubes constitute thrust members whose operative ends are moved in opposite directions when absorbing shock, one tube being connected by one end to one end of the chamber and the other connected by its opposite end to the other end of the chamber, the inner face of the inner wall of the chamber being provided with a braking surface for coöperating with the tube next to it.

7. In a shock absorber, the combination of two thrust members whose opposite ends are moved apart during the absorption of shock, a pneumatic chamber extensible in one direction by being formed of flexible material corrugated transversely to the direction in which it extends, a braking member which lies along the chamber in contact with a braking surface provided on the exterior of the chamber wall so that as the chamber extends the wall rubs along the said member and is pressed against the same by the pneumatic pressure obtaining in the chamber and brake shoes secured to the face of the wall which is opposed to the braking member between the corrugations therein and coöperating with the surface of the braking member.

8. In a shock absorber, the combination of a pneumatic chamber having a sleeve-like wall of flexible material corrugated transversely to the direction of its length to make it extensible, a second inner wall of flexible material which is also of sleeve-like form and of flexible material corrugated transversely to the direction of its length to make it extensible, the inner and outer walls being connected together at their ends so that the pneumatic chamber is of annular form in cross-section, two telescopically-arranged tubes mounted in the throughway, provided at the center of the chamber by the inner wall, which tubes constitute thrust members whose operative ends are moved in opposite directions when absorbing shock, one tube being connected by one end to one end of the chamber and the other connected by its opposite end to the other end of the chamber, the inner face of the inner wall of th chamber being provided with a braking surface for coöperating with the tube next to it, and a spring in the central tube operatively connected at one end to one tube and at the other to the other tube, which spring always tends to oppose the thrusting apart of the operative ends of the thrust members, for the purpose described.

9. In a shock absorber, the combination with two thrust members whose operative ends are moved apart during the absorption of shock, of a flexible pneumatic chamber whose shape is such that opposite ends of it are held in by inflation and are connected to the operative ends of the said two thrust members, one to each, so that the pneumatic chamber is forcibly extended against the action of the pneumatic pressure when the said ends of the thrust members are moved apart during the absorption of shock, the flexible material of which the pneumatic chamber is made being such that it will stretch in a direction lateral to the direction in which the chamber is extended to absorb shock, but will stretch less in the direction of extension.

10. In a shock absorber, the combination with two thrust members whose operative ends are moved apart during the absorption of shock, of a flexible pneumatic chamber whose shape is such that opposite ends of it are held in by inflation and are connected to the operative ends of the said two thrust members, one to each, so that the pneumatic chamber is forcibly extended against the action of the pneumatic pressure when the said ends of the thrust members are moved apart during the absorption of shock, the flexible material of which the walls of the pneumatic chamber are made being built of threads or cords laid approximately parallel with the direction of extension of the chamber for shock absorbing purposes and connected by elastic material.

In testimony whereof I affix my signature.

THOMAS SLOPER.

Copies of this patent may be obtained for five cents each, by addressing the "Commissioner of Patents, Washington, D. C."